United States Patent [19]

Davis et al.

[11] Patent Number: 5,286,798
[45] Date of Patent: Feb. 15, 1994

[54] POLYMER BLENDS FOR HEAT SEAMABLE ROOF SHEETING

[75] Inventors: James A. Davis, Uniontown; Joseph K. Valaitis, Brecksville, both of Ohio

[73] Assignee: Bridgestone/Firestone, Inc., Akron, Ohio

[21] Appl. No.: 864,092

[22] Filed: Apr. 6, 1992

Related U.S. Application Data

[63] Continuation-in-part of Ser. No. 594,457, Oct. 4, 1990, abandoned.

[51] Int. Cl.$^5$ .................. C08K 3/00; C08L 23/16
[52] U.S. Cl. .................. 525/211; 525/232; 524/495; 428/290
[58] Field of Search .................. 525/211, 232; 524/495

[56] References Cited

U.S. PATENT DOCUMENTS

| | | | |
|---|---|---|---|
| 2,054,112 | 9/1936 | Abrams et al. | 106/23 |
| 3,227,675 | 1/1966 | Papalos | 260/41 |
| 3,280,082 | 10/1966 | Natta et al. | 260/80.7 |
| 3,558,538 | 1/1971 | Wollrab et al. | 260/23 |
| 3,650,874 | 3/1972 | Job et al. | 161/217 |
| 3,660,530 | 5/1972 | Hoblit et al. | 525/95 |
| 3,801,531 | 4/1974 | Berejka et al. | 260/33.4 |
| 3,867,247 | 2/1975 | O'Farrell et al. | 161/88 |
| 3,887,530 | 6/1975 | O'Farrell et al. | 260/79.3 |
| 3,919,358 | 11/1975 | Batiuk et al. | 260/897 |
| 3,941,859 | 3/1976 | Batiuk et al. | 260/897 |
| 4,036,912 | 7/1977 | Stricharczuk | 260/897 |
| 4,130,535 | 12/1978 | Coran et al. | 260/33.6 |
| 4,210,579 | 7/1980 | Grigo et al. | 525/88 |
| 4,212,787 | 7/1980 | Matsuda et al. | 260/33.6 |
| 4,220,579 | 9/1980 | Rinehart | 526/88 X |
| 4,229,504 | 10/1980 | Barchman | 428/461 |
| 4,247,661 | 1/1981 | Herman et al. | 525/88 |
| 4,263,186 | 4/1981 | Bluemel | 524/59 |
| 4,355,139 | 10/1982 | Coran et al. | 525/133 |

(List continued on next page.)

FOREIGN PATENT DOCUMENTS

| | | | |
|---|---|---|---|
| 0143131 | 12/1983 | European Pat. Off. | C08J 5/18 |
| 0510409 | 4/1992 | European Pat. Off. | C08L 23/16 |

OTHER PUBLICATIONS

"Rubber-Theromplastic Compositions. Part V. Selecting Polymers For Thermoplastic Vulcanizates", *Rubber Chem. Technol.*, p. 116, vol. 55.

European Search Report, Jul. 20, 1993.

*Primary Examiner*—George F. Lesmes
*Assistant Examiner*—Daniel Zirker
*Attorney, Agent, or Firm*—Frank J. Troy, Sr.

[57] ABSTRACT

A self-adhering heat seamable sheet material for roofing prepared from an uncured polymeric composition of matter which comprises 100 parts by weight of a polymer blend comprising from about 10 to 95 parts by weight of an polymer selected from the group consisting of semi-crystalline polymers having more than about 2 percent be weight crystallinity and polyolefins having up to about 2 percent by weight crystallinity, which polyolefins are prepared from monomers having at least 2 carbon atoms, and mixtures thereof; and from about 5 to 90 parts by weight of a crystallinity enhancing polymer and mixtures thereof; from about 20 to 300 parts by weight of a filler selected from the group consisting of reinforcing and non-reinforcing materials and mixtures thereof per 100 parts of the polymer blend; and from about 20 to 150 parts by weight of a processing material and mixtures thereof, per 100 parts of the polymer blend. A method for covering a roof comprises the steps of applying layers of self-adhering sheet material prepared from an uncured heat seamable polymeric composition of matter comprising blends of polyolefins, semi-crystalline polyolefins and crystallinity enhancing polymers to the roof being covered; overlapping adjacent edges of the layers; heating the overlapped areas to about the softening point of the sheet material and seaming the overlapped areas under sufficient pressure to provide an acceptable seam strength. For practice of the method, the composition of matter is self-adhering, without the use of an adhesive.

2 Claims, No Drawings

U.S. PATENT DOCUMENTS

| | | | |
|---|---|---|---|
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,537,825 | 8/1985 | Yardley | 428/327 |
| 4,601,935 | 7/1986 | Metcalf et al. | 428/57 |
| 4,687,810 | 8/1987 | Coran | 525/74 |
| 4,732,925 | 3/1988 | Davis | 524/426 |
| 4,742,119 | 5/1988 | Close | 525/211 |
| 4,749,731 | 6/1988 | Kyminas et al. | 524/31 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |
| 4,803,020 | 2/1989 | Valaitis et al. | 264/22 |
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,362 | 8/1989 | Muse, Jr. et al. | 525/194 |
| 4,859,723 | 8/1989 | Kyminas et al. | 524/31 |
| 4,894,408 | 1/1990 | Hazelton et al. | 524/425 |
| 4,912,148 | 3/1990 | Kim et al. | 524/487 |
| 4,918,127 | 4/1990 | Adur et al. | 524/415 |
| 4,985,502 | 1/1991 | Izumi et al. | 525/194 |
| 5,025,057 | 6/1991 | Shigemoto | 524/423 |
| 5,030,694 | 7/1991 | Kelley | 525/211 X |
| 5,049,594 | 9/1991 | Jeffs | 523/205 |
| 5,070,111 | 12/1991 | Dumbauld | 521/82 |
| 5,073,597 | 12/1991 | Puydak et al. | 525/232 X |
| 5,086,121 | 2/1992 | Hazelton et al. | 525/197 |
| 5,096,743 | 3/1992 | Schoenbeck | 427/189 |
| 5,159,016 | 10/1992 | Inoue et al. | 525/211 X |
| 5,177,139 | 1/1993 | Klaar et al. | 524/484 |

POLYMER BLENDS FOR HEAT SEAMABLE ROOF SHEETING

CROSS REFERENCE TO RELATED APPLICATION

This application is a continuation-in-part of U.S. Ser. No. 07/594,457, filed Oct. 4, 1990, now abandoned.

TECHNICAL FIELD

The present invention relates generally to sheeting material used for covering roofs. More particularly the sheeting material comprises a blend of an ethylene-propylene-diene terpolymer, referred to herein as EPDM, or ethylene-propylene copolymer, referred to herein as EPR, or other similar olefin type polymers with a crystallinity enhancing polymer. A method is also provided for covering roofs which includes the step of employing an uncured, self-adhering EPDM, EPR or similar polyolefin sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has been rapidly gaining acceptance. This material normally is prepared by vulcanizing uncured composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation and sulfur curing, a disadvantage with utilizing these elastomers is the lack of adhesion of EPDM, especially cured EPDM, to itself. This is a serious problem because in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both short term and long term or stress conditions referred to hereinabove. Moreover, the adhesive must be resistant to oxidation, hydrolysis and chemical attach from ponded water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two (2) to about seven (7) days at room temperature (i.e. 22° C.) to attain maximum adhesive strength. At higher ambient temperature, this time period may be somewhat less, but at minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. No. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous.

Of course, the use of EPDM rubber is not limited to roofing materials. In order to increase use of EPDM and enhance its useful properties it is known to form blends with other polymers.

U.S. Pat. No. 4,833,194, for instance, discloses blends of crystalline and amorphous polymers, such as EPR type rubbers, which provide uncured thermoplastic elastomers having good physical properties and weatherability. Typical of such blends are those comprising from about 5 to about 45 percent by weight of an amorphous ethylene-propylene elastomer having less than 65 percent by weight of ethylene; from about 55 to about 95 percent by weight of an crystalline ethylene-propylene elastomer having at least 60 percent by weight of ethylene; and, from about 2 to about 35 parts by weight of a crystalline polymer made from an olefin monomer.

U.S. Pat. No. 4,855,362, provides polymer alloys, or blends, which comprise a highly unsaturated rubbery polymer, a modified EPDM and at least one thermoplastic polyolefin. The blends are formed in order to take advantage of the properties of the unsaturated rubbery polymer and the EPDM, which polymers are difficult to blend. By modifying the EPDM with N-chlorothio-sulfonamides, they become co-curable with the unsaturated rubbery polymer.

This patent also notes in the Background section that blends of thermoplastic materials, such as polypropylene, with EPDM have been found to possess superior strength, high temperature mechanical properties and good compression set. U.S. Pat. No. 4,130,535 discloses thermoplastic elastomers which comprise 25-75 weight percent of thermoplastic polyolefin resin, such as polypropylene, and 75-25 weight percent of monoolefin copolymer rubber, such as EPDM.

SUMMARY OF THE INVENTION

It is thus an object of the present invention to provide polymer blends for heat seamable roof sheeting materials that need not be cured.

It is another object of the present invention to provide polymer blends for heat seamable roof sheeting materials which eliminate the need for a solvent-based splicing adhesive and the related labor and hardware necessary for mixing and application thereof.

It is yet another object of the present invention to provide polymer blends comprising EPDM, EPR, or other similar olefinic type polymers and a crystallinity enhancing polymer which improves the green strength and splice adhesion of heat seamable roof sheeting materials.

It is still another object of the present invention to provide a method for covering roofs which employs polymer blend heat seamable roof sheeting materials which do not require curing and which can be joined and seamed together at their edges without the use of adhesives.

In general the present invention relates to a self-adhering heat seamable sheet material for roofing prepared from an uncured polymeric composition of matter comprising 100 parts by weight of a polymer blend comprising from about 10 to 95 parts by weight of semi-crystalline polyolefins having more than about 2 percent by weight and polyolefins having up to about 2 percent by weight crystallinity, which polyolefins are prepared from monomers having at least 2 carbon atoms, and mixtures thereof and from about 5 to 90 parts by weight of a crystallinity enhancing polymer; from about 20 to 300 parts by weight of a filler selected from the group consisting of reinforcing and non-reinforcing materials and mixtures thereof per 100 parts of the polymer blend; and from about 20 to 150 parts by weight of a processing material and mixtures thereof, per 100 parts of the polymer blend.

A method for covering a roof is also provided and comprises the steps of applying layers of self-adhering sheet material prepared from an uncured heat seamable, polymeric composition of matter comprising blends of polyolefins, semi-crystalline polyolefins and crystallinity enhancing polymers, to the roof being covered; overlapping adjacent edges of the layers; heating the overlapped areas to about the softening point of the sheet material and seaming the overlapped areas under sufficient pressure to provide an acceptable seam strength the composition of matter having sufficient self-adhesion, without the use of an adhesive.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise a blend of EPDM, EPR or similar olefin type polymers with crystallinity enhancing polymers. The term EPDM is used in the sense of its definition as found in ASTM D-1418-85 and is intended to mean a terpolymer of ethylene, propylene and a diene monomer. Illustrative methods for preparing such terpolymers are found in U.S. Pat. No. 3,280,082 the disclosure of which is incorporated herein by reference. The preferred terpolymers contain from about 60 to about 95 weight percent ethylene and from about zero to about 12 weight percent of the diene with the balance of the terpolymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene,5-ethylidene-2-norbornene,5-n-propylidene-2-norbornene,5-(2-methyl-2-butenyl)-2-norbornene and the like. A typical EPDM is Vistalon ® MD-744 (Exxon Chemical Co.) a terpolymer having a Mooney Viscosity (ML/4 at 125° C.) of about 52; an ethylene/propylene (E/P) ratio of 61/39 weight percent and 2.7 weight percent of unsaturation.

Particularly useful and preferred EPDM materials include Royalene ® 375 (Uniroyal Chemical Co.); and EPsyn ® 5508 (Copolymer Rubber & Chemical Corporation). Royalene ® 375 has a Mooney Viscosity (ML/4 at 125° C.) of about 50.8; an E/P ratio of 75/25 weight percent and about 2.0 weight percent of unsaturation (dicyclopentadiene). EPsyn ® 5508 has a Mooney Viscosity (ML/4 at 125° C.) of about 55.6; and E/P ratio of 73/27 weight percent and about 3.7 weight percent of unsaturation.

The term EPR is used in the sense of its definition as found in ASTM D-1418 and is intended to mean a copolymer of ethylene and propylene. The preferred copolymers contain from about 60 to 95 weight percent ethylene with the balance to total 100 weight percent being propylene. A typical EPR is Vistalon ® 719 (Exxon Chemical Co.) having an ethylene/propylene ratio of about 75/25 weight percent.

To be useful as a roofing material in the present invention it is preferred that the EPDM have at least about 2 weight percent crystallinity, from the ethylene component; an $\overline{M}n$ as measured by GPC of at least about 30,000 and an $\overline{M}w$, as measured by GPC of at least about 100,000. Similarly, the EPR should have at least about 2 weight percent crystallinity (ethylene); an $\overline{M}n$, as measured by GPC of at least about 30,000 and an $\overline{M}w$, as measured by GPC of at least about 100,000. We have found that the selection of an EPDM or EPR having high crystallinity (at least 2 percent by weight) and weight average molecular weight ($\overline{M}w = 100,000$) is necessary to provide a roofing material which does not require curing prior to application, if ever, and which does not require any type of adhesive, solvent-based or the like, to join and seam the spliced edges.

Also useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having an $\overline{M}n$, as measured by GPC of at least about 49,000 and an $\overline{M}w$, as measured by GPC of at least about 221,000. Other similar olefinic type polymers can be used to practice this invention. Generally speaking any semi-crystalline polymer having more than about 2 percent by weight crystallinity and selected from the group consisting of polyolefins prepared from monomers containing at least 2 carbon atoms can be employed. For purposes of discussion herein, references to EPDM, EPR or similar olefinic polymers is intended to include any of the semi-crystalline polymers of the present invention.

In addition to the foregoing polyolefins, other polyolefins having up to about 2 percent by weight crystallinity and prepared from monomers having at least 2 carbon atoms can be employed. These polyolefins have a lower crystallinity than the polyolefins having a crystallinity greater than 2 percent and can be utilized in any amount, from 0 parts to 100 parts, with the higher crystallinity polyolefins. Again, for ease of discussion, this component of the polymeric composition of matter may be referred to herein as EPDM, EPR or other polyolefin.

The composition or compound employed to form the roof sheeting material comprises a blend of 100 total parts by weight of EPDM, EPR or other similar type olefin type polymers, including mixtures of two or more types, and a crystallinity enhancing polymer to which is added basically fillers and processing oil as well as optionally other components including curatives, all of which are discussed hereinbelow.

The crystallinity enhancing polymers of the present invention are selected from the group consisting of polyolefin homopolymers, random copolymers and block copolymers. Homopolymers include polyethylene and polypropylene. Random copolymers include poly(ethylene-co-propylene) copolymers. Block copolymers include poly(ethylene-b-octene) and poly(ethylene-b-butene) copolymers. Mixtures of the foregoing polymers can be employed or a single polymer can be employed to comprise the polymeric blend, with the EPDM or EPR polymer comprising from about 10 to 95 parts by weight for a total of 100 parts of polymer.

Typical examples of commercially available crystallinity enhancing polymer additives that can be blended with EPDM, EPR or other similar polyolefins, materials have been set forth in Table I along with melting temperatures and percent of crystallinity.

TABLE I

| CRYSTALLINITY ENHANCING POLYMERS | | |
|---|---|---|
| ETHYLENE HOMOPOLYMERS | Tm, °C. | % crystallinity |
| POLYWAX 2000[a] | 128 | 89.9 |
| POLYWAX 3000[b] | 121 | 93.2 |
| LDPE 722[c] | 112 | 39.1 |
| LDPE 132[d] | 109 | 27.7 |
| LDPE 640[e] | 113 | 39.9 |
| LDPE 768[f] | 119 | 45.8 |
| LDPE CG-2523[g] | 111 | 53.6 |
| HDPE 12065[h] | 134 | 66.8 |
| HDPE 62013[i] | 131 | 61.2 |
| PETROLITE E-2020[j] | 116 | 85.9 |
| POLYPROPYLENE HOMOPOLYMERS | | |
| EASTOBOND D-7682-109S[k] | 153 | 4.7 |
| A-FAX 500[l] | 155 | 5.8 |
| ETHYLENE/PROPYLENE COPOLYMERS RLX-020[m] | 152 | 35.8 |
| ETHYLENE/OCTENE COPOLYMERS | | |
| ATTANE 4003[n] | 123 | 36.9 |
| ATTANE 4001[o] | 124 | 35.0 |
| DOWLEX ® 2047A[p] | 124 | 39.8 |
| DOWLEX ® 2045[q] | 124 | 42.2 |
| DOWLEX ® 2038[r] | 127 | 53.6 |
| DOWLEX ® 2027[s] | 113 | 41.5 |
| ETHYLENE/BUTENE COPOLYMER GERS-1085[t] | 71 | 2.3 |

[a]High melting polyethylene having a molecular weight of about 2000 (Petrolite)
[b]High melting polyethylene having a molecular weight of about 3000 (Petrolite)
[c]Low density polyethylene resin, density 0.916 (Dow Chemical)
[d]Low density polyethylene resin, density 0.919 (Dow Chemical)
[e]Low density polyethylene resin, density 0.922 (Dow Chemical)
[f]Low density polyethylene resin, density 0.930 (Dow Chemical)
[g]Low density polyethylene resin, density 0.923 (Dow Chemical)
[h]High density polyethylene resin, density 0.94 (Dow Chemical)
[i]High density polyethylene resin, density 0.94 (Dow Chemical)
[j]Petroleum-derived oxidized hydrocarbon having an acid number of 22 (Petrolite)
[k]Amorphous polypropylene (Eastman Chemical)
[l]Amorphous polypropylene (Himont, USA, Inc.)
[m]Ethylene/propylene copolymer (2% Ethylene) molecular weight about 400,000 (Phillip's Petroleum)
[n]Ethylene-octene copolymer, density 0.905 (Dow Chemical)
[o]Ethylene-octene copolymer, density 0.912 (Dow Chemical)
[p]Ethylene-octene copolymer, density 0.917 (Dow Chemical)
[q]Ethylene-octene copolymer, density 0.920 (Dow Chemical)
[r]Ethylene-octene copolymer, density 0.935 (Dow Chemical)
[s]Ethylene-octene copolymer, density 0.941 (Dow Chemical)
[t]Ethylene-butene copolymer (about 82% ethylene), density 0.884 (Union Carbide Corporation)

The crystallinity enhancing polymers are necessary, or of greater importance, when the polymer blend comprises increasing amounts of polyolefins having less than 2 percent by weight crystallinity. However, even if the polyolefin selected is exclusively one having crystallinity greater than 2 percent by weight, the presence of a crystallinity enhancing polymer of the present invention provides increased adhesion, as reflected in higher peel and shear adhesion values reported hereinbelow.

With respect to the filler, suitable fillers are selected from the group consisting of reinforcing and non-reinforcing materials, and mixtures thereof, as are customarily added to rubber. Examples include both inorganic and organic materials such as carbon black, ground coal, calcium carbonate, clay, silica, cryogenically ground rubber and the like. Generally, preferred fillers include carbon black, ground coal and cryogenically ground rubber.

Carbon black is used in an amount of about 20 parts to about 300 parts per 100 parts of the polymer blend (phr), preferably in an amount of about 60 to about 150 phr. The preferred range of carbon black herein (60 to 150 phr) is about equal to the amount of carbon black normally used in preparing sulfur cured EPDM sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of $0.69 \pm 0.46$ as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of $1.22 \pm 0.03$, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of $1.129 \pm 0.015$ and a particle size ranging from about 30 to about 300 microns with an average particle size ranging from about 50 to about 80 microns. Amounts range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Amounts thereof fall within the range of amounts normally employed in preparing sulfur cured conventional roof sheeting.

With respect to the processing material, it is included to improve the processing behavior of the composition (i.e. reduce mixing time and increase rate of sheet forming) and includes processing oils, waxes and the like). The process oil is included in an amount ranging from about 20 parts to about 150 parts process oil phr, preferably in an amount ranging from about 60 parts to about 135 phr. A preferred processing oil is a paraffinic oil, e.g. Sunpar 2280 which is available from the Sun Oil Company. Other petroleum derived oils including naphthenic oils are also useful.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other conventional agents, such as zinc oxide, stearic acid, antioxidants, antiozonants, flame retardants, and the like.

Regarding curatives, sulfur is preferred in amounts of about 0.3 to 2 phr. As noted hereinabove, the roof sheeting compound is not cured prior to application and needed not be cured subsequent thereto. The presence of sulfur enhances bonding of the seams.

The compounding ingredients can be admixed, utilizing an internal mixer (such as a Banbury mixer), an extruder, and/or a two-roll mill, or other mixers suitable for forming a viscous relatively uniform admixtures. When utilizing a type B Banbury internal mixer, in a preferred mode, the dry or powdery materials such as carbon black are added first followed by the liquid process oil and finally EPDM or other polyolefin and crystallinity enhancing polymer (this type of mixing can be referred to as an upside-down mixing technique).

The resulting admixture is sheeted to thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single-ply" roofing membranes used commercially. The sheeting can be cut to desired length and width dimensions at this time.

The method of the present invention is practiced by utilizing an EPDM or EPR based elastomeric composite sheet material as described herein. As the sheet is unrolled over the roof substructure in an otherwise conventional fashion, the seams of adjacent sheet layers are overlapped. Overlapping (seam width) can vary according to meet the environment as well as the requirements specified by the architect, building contractor or roofing contractor and thus, does not constitute a limitation of the present invention.

Assuming an overlap of several inches, the next step is to apply heat and pressure to the edge area to form the seam. Temperature is conveniently applied from about 80° to 550° C. Generally, the seam area, comprising overlapping edges of adjacent sheets, should be heated to about the softening point of the sheet material. Numerous techniques which utilize heat and pressure can be used to produce an effective seam as are known to those skilled in the art. Pressure can vary widely from a minimum of about 3 psi up to about 60 psi, typically so long as it is adequate to provide an acceptable seam strength.

In order to demonstrate practice of the present invention, several compounds were prepared and subjected to both peel and shear adhesion tests, as will now be set forth in detail. The EPDM polymers selected included Royalene ® 375; EPsyn ® 5508: and Vistalon ® MD-744. Characterization of each of the polymers is presented in Table II hereinbelow.

TABLE II
POLYMER CHARACTERIZATION STUDY

|  | Royalene® 375 | EPsyn® 5508 | Vistalon® MD-744 | GERS 1085 |
|---|---|---|---|---|
| ML/4 at 125° C. | 51 | 55 | 53 | 30 |
| Ethylene Content, wt % | 76 | 73 | 60 | 82 |
| Crystallinity, wt % | 14.6 | 9.2 | <1 | 2.3 |
| Tg, °C. (by DSC) | −50.6 | −43.6 | −56.4 | −64.6 |
| Tm, °C. (by DSC) | 49.3 | 40.1 | 41.6 | 45, 70 |
| Unsaturation, % | 2.0 | 3.8 | 2.7 | — |
| Type of unsaturation | DCPD[a] | ENB[b] | ENB[b] | — |
| Mn | 69,500 | 97,800 | 73,200 | 49,100 |
| Mw | 190,300 | 229,100 | 360,400 | 221,700 |
| Mn/Mw ratio | 2.85 | 2.34 | 4.92 | 4.52 |

[a]dicyclopentadiene
[b]5-ethylidene-2-norbornene

The polymers in Table II, except for Vistalon® MD-744 and GERS-1085 (ethylene/butene copolymer), differ from other commercially available EPDM's (i.e., Royalene® 3180, Royalene® 2859, Vistalon® 2200, etc.), in that, they are highly crystalline, high ethylene containing polymers. However many of the other polymer properties listed above are similar to most of the commercially available EPDM terpolymers.

The following examples are submitted for the purpose of further illustrating the nature of the present invention and are not to be considered as a limitation on the scope thereof. Parts and percentages are by weight, unless otherwise indicated.

TABLE IIIA
COMPOSITION OF EPDM AND CRYSTALLINITY ENHANCING POLYMER BLENDS

| Example No. | 1* | 2 | 3 | 4 | 5 | 6 | 7 |
|---|---|---|---|---|---|---|---|
| Royalene® 375 | — | — | 85 | — | 60 | 60 | 75 |
| GERS-1085 | — | 100 | — | — | — | — | — |
| Vistalon® MD-744 | 100 | — | — | 65 | — | — | — |
| Polywax 2000 | — | — | 15 | — | — | — | — |
| LDPE-768 | — | — | — | 35 | 40 | — | — |
| Dowlex® 2027A | — | — | — | — | — | 40 | — |
| LDPE-132 | — | — | — | — | — | — | 25 |
| Dowlex® 2038 | — | — | — | — | — | — | — |
| Dowlex® 2049A | — | — | — | — | — | — | — |
| HDPE-12065 | — | — | — | — | — | — | — |
| HDPE-62013 | — | — | — | — | — | — | — |
| HiStr GPF black | 130 | 128 | 128 | 128 | 128 | 128 | 128 |
| Sunpar 2280 oil | 88 | 90 | 90 | 90 | 90 | 90 | 90 |
| Sulfur | 0.90 | — | — | — | — | — | — |
| Austin black | — | 16 | 16 | 16 | 16 | 16 | 16 |
| Zinc oxide | 4 | — | — | — | — | — | — |
| Stearic acid | 1 | — | — | — | — | — | — |
| Curing Ingredients | 3.3 | — | — | — | — | — | — |
| Total | 327.2 | 334.0 | 334.0 | 334.0 | 334.0 | 334.0 | 334.0 |

*Sulfur cured conventional black EPDM membrane

TABLE IIIB
COMPOSITION OF EPDM AND CRYSTALLINITY ENHANCING POLYMER BLENDS

| Example No. | 8 | 9 | 10 | 11 | 12 | 13 | 14 |
|---|---|---|---|---|---|---|---|
| Royalene® 375 | 50 | 50 | 50 | 75 | 75 | 75 | 75 |
| GERS-1085 | — | — | — | — | — | — | — |
| Vistalon® MD-744 | — | — | — | — | — | — | — |
| Polywax 2000 | — | — | — | — | — | — | — |
| LDPE-768 | — | — | — | 25 | — | — | — |
| Dowlex® 2027A | — | — | — | — | 25 | — | — |
| LDPE-132 | — | — | — | — | — | — | — |
| Dowlex® 2038 | 50 | — | — | — | — | — | — |
| Dowlex® 2049A | — | 50 | — | — | — | — | — |
| HDPE-12065 | — | — | 50 | — | — | 25 | — |
| HDPE-62013 | — | — | — | — | — | — | 25 |
| HiStr GPF black | 128 | 128 | 128 | 128 | 128 | 128 | 128 |
| Sunpar 2280 oil | 90 | 90 | 90 | 90 | 90 | 90 | 90 |
| Sulfur | — | — | — | — | — | — | — |
| Austin black | 16 | 16 | 16 | 16 | 16 | 16 | 16 |
| Zinc oxide | — | — | — | — | — | — | — |
| Stearic acid | — | — | — | — | — | — | — |
| Total | 334.0 | 334.0 | 334.0 | 334.0 | 334.0 | 334.0 | 334.0 |

In the examples illustrated in Tables IIIA and B, Example No. 1 provided a sulfur cured black EPDM membrane. The sulfur cured EPDM was prepared utilizing standard rubber mixing techniques and equipment by mixing together the following ingredients: 100 parts EPDM terpolymer, 130 phr carbon black, 88 phr paraffinic process oil, 4 phr zinc oxide, 1 phr stearic acid, 0.9 phr sulfur and 3.3 phr rubber curing ingredients. The remaining examples Nos. 2–14 comprised only the polymeric material, filler and processing oil to provide compounds that could be sheeted and tested without curing. Complete formulations for each example appear in Tables III A and B, hereinabove with all parts given on the basis of parts per hundred parts of rubber (phr) by weight, unless otherwise specified.

DETAILED PEEL AND SHEAR ADHESION TEST PROCEDURE

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron Universal Tester—a testing machine of the constant rate-of-jaw separation type. The machine was equipped with suitable grips capable of clamping the specimens firmly and without slippage throughout the tests.
8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.
9. Adhesion strength is defined as:

peel adhesion strength (lbs/inch)=pounds force×sample width;

shear adhesion strength (lbs/square inch)=pounds force×sample width.

Physical properties of each of the rubber compounds were measured and have been reported in Tables IVA and B hereinbelow. The uncured black and oil filled membranes featuring EPDM and crystallinity enhancing polymers exemplified in Tables IVA and B were characterized as harder, higher modulus polymeric compositions having unaged die C tear resistance equivalent to or slightly less than the sulfur cured EPDM membrane control, Example No. 1.

Adhesion tests with the conventional EPDM material of Example No. 1 included the use of a butyl based lap splice adhesive, SA-1065, available from Uniroyal Chemical Co. Peel and shear adhesion at increasing temperatures for Example No. 1, the sulfur cured control, are reported in Tables VA and B hereinbelow. Unaged peel adhesion and shear adhesion tests conducted with Examples Nos. 2–14, utilized to form the test pads, are reported in Tables VIA, B–IXA, B, respectively. Crosshead and chart speeds for all adhesion tests were conducted at the rate of two inches per minute (ipm).

TABLE IVA

UNAGED PHYSICAL PROPERTIES OF EPDM AND CRYSTALLINITY ENHANCING POLYMER BLENDS IN A HEAT SEAMABLE MEMBRANE

| Example No. | 1 | 2 | 3 | 4 | 5 | 6 | 7 |
|---|---|---|---|---|---|---|---|
| Stress-Strain Properties at 23° C. | | | | | | | |
| 100% Modulus, psi | 470 | 535 | 300 | 325 | 440 | — | 410 |
| 300% Modulus, psi | 1120 | — | 655 | 730 | — | — | 725 |
| Tensile at break, psi | 1435 | 660 | 870 | 775 | 595 | 225 | 835 |
| Elongation at break, % | 420 | 180 | 490 | 325 | 215 | 50 | 380 |
| Low Strain Modulus at 23° C. | | | | | | | |
| 10% Modulus, psi | 65 | 140 | 85 | 125 | 150 | 230 | 140 |
| Low Strain Modulus at 70° C. | | | | | | | |
| 10% Modulus, psi | 45 | 48 | 16 | 43 | 70 | 40 | 60 |
| Die C Tear at 23° C. | | | | | | | |
| Lbs/inch | 221 | 134 | 175 | 139 | 156 | 76 | 187 |
| Shore "A" hardness | | | | | | | |
| Tested at 23° C. | 64 | 72 | 61 | 70 | 78 | 77 | 72 |

TABLE IVB

UNAGED PHYSICAL PROPERTIES OF EPDM AND CRYSTALLINITY ENHANCING POLYMER BLENDS IN A HEAT SEAMABLE MEMBRANE

| Example No. | 8 | 9 | 10 | 11 | 12 | 13 | 14 |
|---|---|---|---|---|---|---|---|
| Stress-Strain Properties at 23° C. | | | | | | | |
| 100% Modulus, psi | 760 | 830 | 1005 | 405 | 1015 | 580 | 600 |
| 300% Modulus, psi | 1025 | 1150 | — | 660 | — | — | — |
| Tensile at break, psi | 1080 | 1185 | 1030 | 815 | 1065 | 645 | 745 |
| Elongation at break, % | 325 | 320 | 110 | 420 | 120 | 130 | 165 |
| Low Strain Modulus at 23° C. | | | | | | | |
| 10% Modulus, psi | 360 | 350 | 800 | 135 | 775 | 240 | 505 |
| Low Strain Modulus at 70° C. | | | | | | | |
| 10% Modulus, psi | 200 | 180 | 390 | 150 | 310 | 160 | 155 |
| Die C Tear at 23° C. | | | | | | | |
| Lbs/inch | 265 | 213 | 194 | 206 | 185 | 197 | 204 |
| Shore "A" hardness | | | | | | | |
| Tested at 23° C. | 87 | 86 | 90 | 75 | 80 | 86 | 83 |

TABLE VA

PEEL ADHESION OF SULFUR CURED EPDM MEMBRANE

Unaged seams

Membrane seam interply peel adhesion at 23° C.

TABLE VA-continued

PEEL ADHESION OF SULFUR CURED EPDM MEMBRANE
Unaged seams

| | |
|---|---|
| lbs/inch | 13.00 |
| type of failure | adhesive |
| Membrane seam interply peel adhesion at 50° C.-15 minute preheat at 50° C. | |
| lbs/inch | 7.25 |
| type of failure | adhesive |
| Membrane seam interply peel adhesion at 70° C.-15 minute preheat at 70° C. | |
| lbs/inch | 1.2 |
| type of failure | adhesive |
| Membrane seam interply peel adhesion at 82° C.-15 minute preheat at 82° C. | |
| lbs/inch | 1 |
| type of failure | adhesive |
| Membrane seam interply peel adhesion at 100° C.-15 minute preheat at 100° C. | |
| lbs/inch | 0.85 |
| type of failure | adhesive |

TABLE VB

SHEAR STRENGTH OF SULFUR CURED EPDM MEMBRANE
Unaged seams

| | |
|---|---|
| Membrane seam shear strength at 23° C. | |
| lbs/square inch | 27.25 |
| type of failure | adhesive |
| Membrane seam shear strength at 50° C.-15 minute preheat at 50° C. | |
| lbs/square inch | 18.5 |
| type of failure | adhesive |
| Membrane seam shear strength at 70° C.-15 minute preheat at 70° C. | |
| lbs/square inch | 11.5 |
| type of failure | adhesive |
| Membrane seam shear strength at 82° C.-15 minute preheat at 82° C. | |
| lbs/square inch | 9.5 |
| type of failure | adhesive |
| Membrane seam shear strength at 100° C.-15 minute preheat at 100° C. | |
| lbs/square inch | 7.75 |
| type of failure | adhesive |

TABLE VIA

PEEL ADHESION STUDY OF EPDM AND CRYSTALLINITY ENHANCING POLYMER BLENDS

| Example No. | 2 | 3 | 4 | 5 | 6 | 7 |
|---|---|---|---|---|---|---|
| Peel Adhesion at 23° C. | | | | | | |
| Heat setting #6 (260° C.) | | | | | | |
| Lbs/inch | 4.5 | 4 | 2 | 5.5 | 8 | 27 |
| Type of failure | (A) | (A) | (A) | (A) | (A) | (A) |
| Heat setting #8 (425° C.) | | | | | | |
| Lbs/inch | 16.5 | >41 | >52 | >36 | 39.5 | >58.5 |
| Type of failure | (A) | (B) | (B) | (B) | (A) | (B) |
| Heat setting #10 (550° C.) | | | | | | |
| Lbs/inch | 15.5 | >35 | >40 | >35 | >75.5 | >46 |
| Type of failure | (A) | (B) | (B) | (B) | (B) | (B) |

(A) = Failure or separation between plies. (Weld failure)
(B) = Some tearing at interface, followed by rubber separating from the fabric reinforcement.

TABLE VIB

PEEL ADHESION STUDY OF EPDM AND CRYSTALLINITY ENHANCING POLYMER BLENDS

| Example No. | 8 | 9 | 10 | 11 | 12 | 13 | 14 |
|---|---|---|---|---|---|---|---|
| Peel Adhesion at 23° C. | | | | | | | |
| Heat setting #6 (260° C.) | | | | | | | |
| Lbs/inch | 14 | 12 | 3.5 | 5.5 | 14 | 8 | 2 |
| Type of failure | (A) | (A) | (A) | (A) | (A) | (A) | (A) |
| Heat setting #8 (425° C.) | | | | | | | |
| Lbs/inch | 18.5 | >21 | 6 | >28.5 | 22.5 | >28.5 | 6.5 |
| Type of failure | (A) | (B) | (A) | (B) | (A) | (B) | (A) |
| Heat setting #10 (550° C.) | | | | | | | |
| Lbs/inch | 23.5 | >24 | 12.8 | 43 | >37.5 | >29.5 | 23.5 |
| Type of failure | (A) | (B) | (A) | (A) | (B) | (B) | (A, B) |

(A) = Failure or separation between plies. (Weld failure)
(B) = Some tearing at interface, followed by rubber separating from the fabric reinforcement.

TABLE VIIA

SHEAR STRENGTH OF EPDM AND CRYSTALLINITY ENHANCING POLYMER BLENDS

| Example No. | 2 | 3 | 4 | 5 | 6 | 7 |
|---|---|---|---|---|---|---|
| Shear Strength at 23° C. | | | | | | |
| Heat setting #6 (260° C.) | | | | | | |
| Lbs/square inch | 43.5 | 47 | 67 | >99.5 | >102 | >48.5 |
| Type of failure | (A) | (A) | (A) | (B) | (B) | (A) |
| Heat setting #8 (425° C.) | | | | | | |
| Lbs/square inch | 43 | >88 | >86 | >106 | >104 | >62 |
| Type of failure | (A) | (B) | (B) | (B) | (B) | (B) |
| Heat setting #10 (550° C.) | | | | | | |
| Lbs/square inch | 42 | >53 | >43 | >108 | >74.5 | >58.5 |

TABLE VIIA-continued

SHEAR STRENGTH OF EPDM AND CRYSTALLINITY ENHANCING POLYMER BLENDS

| Example No. | 2 | 3 | 4 | 5 | 6 | 7 |
|---|---|---|---|---|---|---|
| Type of failure | (A) | (B) | (B) | (B) | (B) | (B) |

(A) = Failure or separation between plies. (Weld failure)
(B) = Some tearing at interface, followed by rubber separating from the fabric reinforcement.

TABLE VIIB

SHEAR STRENGTH OF EPDM AND CRYSTALLINITY ENHANCING POLYMER BLENDS

| Example No. | 8 | 9 | 10 | 11 | 12 | 13 | 14 |
|---|---|---|---|---|---|---|---|
| Shear Strength at 23° C. | | | | | | | |
| Heat setting #6 (260° C.) | | | | | | | |
| Lbs/square inch | 82.5 | 71.5 | 23 | 81 | >92.5 | 51.5 | 66 |
| Type of failure | (A) | (A) | (A) | (A) | (B) | (A) | (A) |
| Heat setting #8 (425° C.) | | | | | | | |
| Lbs/square inch | >107.5 | >106 | >72.5 | >93 | >85 | >75.5 | >73 |
| Type of failure | (B) | (B) | (B) | (B) | (B) | (B) | (B) |
| Heat setting #10 (550° C.) | | | | | | | |
| Lbs/square inch | >116.5 | >118 | >78 | >76 | >84.5 | >82 | >79 |
| Type of failure | (B) | (B) | (B) | (B) | (B) | (B) | (B) |

(A) = Failure or separation between plies. (Weld failure)
(B) = Some tearing at interface, followed by rubber separating from the fabric reinforcement.

TABLE VIIIA

SHEAR STRENGTH OF EPDM AND CRYSTALLINITY ENHANCING POLYMER BLENDS

| Example No. | 2 | 3 | 4 | 5 | 6 | 7 |
|---|---|---|---|---|---|---|
| Shear Strength at 70° C. | | | | | | |
| Heat setting #6 (260° C.) | | | | | | |
| Lbs/square inch | 30.5 | >26 | >56.5 | 44.5 | 23 | >31 |
| Type of failure | (A) | (B) | (B) | (A) | (A) | (B) |
| Heat setting #8 (425° C.) | | | | | | |
| Lbs/square inch | >37.5 | >30 | >45.5 | >46 | >45.5 | >36 |
| Type of failure | (B) | (B) | (B) | (B) | (B) | (B) |
| Heat setting #10 (550° C.) | | | | | | |
| Lbs/square inch | 37 | >36 | >46 | >50 | >43.5 | >33 |
| Type of failure | (A) | (B) | (B) | (B) | (B) | (B) |

(A) = Failure or separation between plies. (Weld failure)
(B) = Some tearing at interface, followed by rubber separating from the fabric reinforcement.

TABLE VIIIB

SHEAR STRENGTH OF EPDM AND CRYSTALLINITY ENHANCING POLYMER BLENDS

| Example No. | 8 | 9 | 10 | 11 | 12 | 13 | 14 |
|---|---|---|---|---|---|---|---|
| Shear strength at 70° C. | | | | | | | |
| Heat setting #6 (260° C.) | | | | | | | |
| Lbs/square inch | >52.5 | 70.5 | 74 | 33 | 32 | 24.5 | 14.5 |
| Type of failure | (B) | (A) | (A) | (A) | (A) | (A) | (A) |
| Heat setting #8 (425° C.) | | | | | | | |
| Lbs/square inch | >64 | >87.5 | >82 | >45 | >40.5 | >46.5 | >48 |
| Type of failure | (B) | (B) | (B) | (B) | (B) | (B) | (B) |
| Heat setting #10 (550° C.) | | | | | | | |
| Lbs/square inch | >73.5 | >84 | >89 | >34 | >47 | >42.5 | >47 |
| Type of failure | (B) | (B) | (B) | (B) | (B) | (B) | (B) |

(A) = Failure or separation between plies. (Weld failure)
(B) = Some tearing at interface, followed by rubber separating from the fabric reinforcement.

TABLE IXA

SHEAR STRENGTH OF EPDM AND CRYSTALLINITY ENHANCING POLYMER BLENDS

| Example No. | 2 | 3 | 4 | 5 | 6 | 7 |
|---|---|---|---|---|---|---|
| Shear Strength at 100° C. | | | | | | |
| Heat setting #6 (260° C.) | | | | | | |
| Lbs/square inch | 5.5 | 16 | 15.5 | 13 | >37 | >30.5 |
| Type of failure | (A) | (A, B) | (A, B) | (A) | (B) | (B) |
| Heat setting #8 (425° C.) | | | | | | |
| Lbs/square inch | 27.5 | 29.5 | >34 | >32.5 | >35 | >24 |
| Type of failure | (A) | (A, B) | (B) | (B) | (B) | (B) |

TABLE IXA-continued
SHEAR STRENGTH OF EPDM AND CRYSTALLINITY ENHANCING POLYMER BLENDS

| Example No. | 2 | 3 | 4 | 5 | 6 | 7 |
|---|---|---|---|---|---|---|
| Heat setting #10 (550° C.) | | | | | | |
| Lbs/square inch | 23.5 | >25 | >30.5 | >31.5 | >36.5 | >24.5 |
| Type of failure | (A) | (B) | (B) | (B) | (B) | (B) |

(A) = Failure or separation between plies. (Weld failure)
(B) = Some tearing at interface, followed by rubber separating from the fabric reinforcement.

TABLE IXB
SHEAR STRENGTH OF EPDM AND CRYSTALLINITY ENHANCING POLYMER BLENDS

| Example No. | 8 | 9 | 10 | 11 | 12 | 13 | 14 |
|---|---|---|---|---|---|---|---|
| Shear Strength at 100° C. | | | | | | | |
| Heat setting #6 (260° C.) | | | | | | | |
| Lbs/square inch | 40.5 | 12.5 | 51.5 | >27.5 | >39 | 8.5 | 5.5 |
| Type of failure | (A, B) | (A) | (A) | (B) | (B) | (A) | (A) |
| Heat setting #8 (425° C.) | | | | | | | |
| Lbs/square inch | >47.5 | >50.5 | >71 | >31 | >42.5 | >37.5 | >43.5 |
| Type of failure | (B) | (B) | (B) | (B) | (B) | (B) | (B) |
| Heat setting #10 (550° C.) | | | | | | | |
| Lbs/square inch | >56 | >54 | >65.5 | >29 | >36.5 | >34.5 | >38 |
| Type of failure | (B) | (B) | (B) | (B) | (B) | (B) | (B) |

(A) = Failure or separation between plies. (Weld failure)
(B) = Some tearing at interface, followed by rubber separating from the fabric reinforcement.

Lastly, EPsyn ® 5508 was evaluated in a formulation comprising 50 parts by weight of EPsyn ® 5508; 50 parts by weight of Dowlex ® 2027A (copolymer of ethylene and octene); 125 phr carbon black; 16 phr Austin Black and 90 phr of Sunpar 2280 process oil, for a total of 331 parts. Physical properties and adhesion values were determined as noted above and are reported in Table X. In addition to unaged shear adhesion, several of the test samples were aged for seven days at 70° C. prior to testing. Aged shear adhesion at 23° C. and 70° C. is also reported in Table X.

TABLE X
PHYSICAL PROPERTIES AND ADHESION VALUES INVOLVING A 50/50 BLEND OF EPSYN ® 5508/ DOWLEX ® 2027A IN A HEAT SEAMABLE MEMBRANE

| Example No. | 15 |
|---|---|
| Unaged Stress-Strain Properties at 73° C. | |
| Tensile at break, psi | 650 |
| Elongation at break, % | 90 |
| Unaged Die C Tear at 23° C. lbs/inch | 241 |
| Unaged Shore A Hardness at 23° C. tested at 73° C. | 74 |
| Unaged Shear Strength at 23° C. | |
| Heat setting #8 (425° C.) | |
| Lbs/square inch | >100 |
| Type of Failure | (B) |
| Unaged Shear Strength at 70° C. | |
| Heat setting #8 (425° C.) | |
| Lbs/square inch | >53 |
| Type of Failure | (B) |
| Unaged Shear Strength at 100° C. | |
| Heat setting #8 (425° C.) | |
| Lbs/square inch | >33 |
| Type of Failure | (B) |
| Aged Shear Strength at 23° C.* | |
| Heat setting #8 (425° C.) | |
| Lbs/square inch | >110 |
| Type of Failure | (B) |
| Aged Shear Strength at 70° C.* | |
| Heat setting #8 (425° C.) | |
| Lbs/square inch | >69 |
| Type of Failure | (B) |

(B) Initial tearing at ply-to-ply interface, followed by rubber tearing to the fabric reinforcement (rubber-to-fabric failure)
*Test samples aged 7 days at 70° C. prior to testing Based on the test results in Tables VIA, B-IXA, B, peel adhesion and seam shear strength adhesion values were generally significantly better than for the sulfur cured EPDM membrane Example No. 1 (control) thereby demonstrating than the use of EPDM, EPR or other similar olefin type polymers including ethylene-octene or ethylene-butene copolymers or blends thereof and crystallinity enhancing polymers (e.g., homopolymers of ethylene and propylene, random and block copolymers of ethylene and propylene, etc.) in black and oil filled compounds using sufficient pressure and heat (usually in the form of hot air) allow the formation of a self-adhering seam without the use of adhesives. Moreover, the sheet materials do not require special curing ingredients nor, do they require that a dusting or release agent be applied to the surface of the membrane followed by autoclave curing.

It is to be understood that the invention is not limited to the specific type of EPDM exemplified herein or by the disclosure or other typical EPDM, EPR or other similar olefin type polymers provided herein, the Examples Nos. 2-15 having been provided merely to demonstrate practice of the subject invention. Those skilled in the art may readily select other EPDM or EPR as well as other similar polyolefins and crystallinity enhancing polymers. Similarly, the invention is not necessarily limited to the particular fillers and processing oil exemplified or the amounts thereof.

In order to demonstrate that the compositions of the present invention exhibit far superior physical properties, including better peel adhesion and shear seam strength, as compared with those disclosed by U.S. Pat. No. 4,833,194, a composition according to the present invention, Example No. 16, was prepared and compared against Examples I and III of U.S. Pat. No. 4,833,194, as Examples No. 17 and 18 respectively. Compositions for these three examples are presented in Table XI. Physical properties of these three compounds were determined and have been reported in Table XII.

TABLE XI
HEAT SEAMABLE EPDM MEMBRANE COMPOSITIONS

| Example No. | 16 | 17 | 18 |
|---|---|---|---|
| Vistalon ® MD-744 | 60 | — | — |
| HDPE-12065 | 40 | — | — |
| Nordel ® 2760 | — | — | 60 |
| Nordel ® 2744 | — | 25 | — |
| Nordel ® 1070 | — | 25 | 20 |
| Vistalon ® 707 | — | 80 | — |
| Petrothene/Na 208 | — | — | 15 |
| HiStr GPF black | 110 | — | — |
| HiStr HAF black | — | — | 15 |
| Titanium dioxide | — | 10 | — |
| Calcium carbonate | — | 250 | 125 |
| Clay (untreated) | — | — | 25 |
| Sunpar 2280 oil | 70 | — | — |
| Petroleum-based plasticizer[a] | — | 3 | 27.5 |
| Zinc stearate | — | — | 1.0 |
| Mark 1500[b] | — | 0.1 | 0.1 |
| AO 2246[c] | — | 0.1 | 0.1 |
| UV light absorber[d] | — | 0.2 | 0.2 |
| TOTAL | 280.0 | 363.4 | 288.9 |

[a] Petrolatum ® SR-172 (soft, oily, amorphous substance, used as a softener, process aid, and internal lubricant (C.P. Hall Company)
[b] A phosphite heat stabilizer (Argus Chemical Div., Witco Corp.)
[c] Antioxidant 2,2' Methylene-bis-(4-methyl-6-tert-butyl-phenol) (R.T. Vanderbilt)
[d] A Benzotriazole ultraviolet light stabilizer-Tinuvin ® P (2(2'-Hydroxy-5-methyl-phenyl)benzotriazole (Ciba-Geigy Chemical)

TABLE XII
UNAGED PHYSICAL PROPERTIES

| Example No. | 16 | 17 | 18 |
|---|---|---|---|
| Stress-Strain Properties at 23° C. | | | |
| Unaged | | | |
| 100% Modulus, psi | 715 | 235 | 260 |
| 300% Modulus, psi | — | 430 | 375 |
| Tensile at break, psi | 830 | 510 | 650 |
| Elongation at break, % | 220 | 440 | 630 |
| Die C Tear Properties at 23° C. | | | |
| Unaged | | | |
| Lbs./inch | 261 | 109 | 125 |
| Shore "A" Hardness Tested at 23° C. | 85 | 76 | 73 |

As clearly evident from Table XII, Example No. 16 provides better physical properties than Examples No. 17 or 18.

Next, Examples Nos. 16–18 were subjected to unaged peel adhesion and shear adhesion testing, the results for which have been reported in Tables XIII and XIV, respectively.

TABLE XIII
PEEL ADHESION COMPARATIVE STUDY

| Example No. | 16 | 17 | 18 |
|---|---|---|---|
| Seam Peel Adhesion at 23° C.-Scrim Reinforced | | | |
| Lbs./inch | 13.5 | 10.6 | 17.5 |
| Type failure | (B) | (B) | (B) |
| Seam Peel Adhesion at 70° C.-Scrim Reinforced-Preheat test specimens for 15 minutes before testing | | | |
| Lbs./inch | 10.5 | 0.4 | 0.6 |
| Type failure | (B) | (A, B) | (A, B) |
| Seam Peel Adhesion at 95° C.-Scrim Reinforced-Preheat test specimens for 15 minutes before testing | | | |
| Lbs./inch | 1.5 | 0.5 | 0.2 |
| Type failure | (B) | (A, B) | (A, B) |

Heat Gun Setting: No. 9 (peak hot air temperature, 442° C.)

(A) = Weld failure (separation between plies)
(B) = Initial tearing at ply-to-ply interface, followed by rubber tearing to the fabric reinforcement (rubber-to-fabric failure)

TABLE XIV
SEAM SHEAR STRENGTH ADHESION COMPARATIVE STUDY

| Example No. | 16 | 17 | 18 |
|---|---|---|---|
| Seam Shear Strength Adhesion at 23° C.-Scrim Reinforced | | | |
| Lbs./square inch | >105 | >38 | >71 |
| Type failure | (C) | (C) | (C) |
| Seam Shear Strength Adhesion at 70° C.-Scrim Reinforced-Preheat test specimens for 15 minutes before testing | | | |
| Lbs./square inch | >60 | >23 | >35 |
| Type failure | (C) | (C) | (C) |
| Seam Shear Strength Adhesion at 95° C.-Scrim Reinforced-Preheat test specimens for 15 minutes before testing | | | |
| Lbs./square inch | >47 | >17 | >24 |
| Type failure | (C) | (C) | (C) |

Heat Gun Setting: No. 9 (Peak hot air temperature, 422° C.)

(C) = Necking/breaking-scrim reinforced rubber test strip elongated and broke adjacent to the weld seam With respect to Table XIII, seam peel adhesion properties at elevated temperatures were significantly greater for Example No. 16 than Examples No. 17 or 18. Similarly, seam shear adhesion properties at all temperatures were better for Examples No. 16 than Examples No. 17 or 18. Accordingly, it should be evident that although U.S. Pat. No. 4,833,194 employs blends of amorphous and crystalline EPR's with crystalline polymers, the compositions of the present invention exhibit properties and performance due to the greater crystallinity of the polymer blend components.

In conclusion, it should be clear from the foregoing examples and specification disclosure that the use of EPDM, EPR or other similar polyolefins with crystallinity enhancing polymers to prepare sheet material for roofing allows such sheet material to be seamed using pressure and heat. The seams are self adhering without the use of adhesives. Moreover, the sheet materials do not require curing. It is to be understood that the invention is not limited to the specific types of EPDM and crystallinity enhancing polymers exemplified herein or by the disclosure of other typical polyolefins and crystallinity enhancing polymers provided herein, the examples having been provided merely to demonstrate practice of the subject invention. Those skilled in the art may readily select other polymers than EPDM, EPR and crystallinity enhancing polymers according to the disclosure made hereinabove. Similarly, the invention is not necessarily limited to the particular fillers and processing oil exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A self-adhering heat seamable sheet material for roofing prepared from an uncured polymeric composition of matter comprising:

100 parts by weight of a polymer blend comprising from at least about 25 to 95 parts by weight of a polymer selected from the group consisting of polyolefins having less than 1 percent by weight crystallinity and having an ethylene content of up to about 60 to 61 percent by weight, said polyolefins being prepared from monomers having at least 2 carbon atoms and mixtures thereof; and from about 5 to 75 parts by weight of a crystallinity enhancing polymer selected from the group consisting of polyethylene and polypropylene homopolymers, poly(ethylene-co-propylene) random copolymers and poly(ethylene-b-octene) and poly(ethylene-b-butene) block copolymers, said crystallinity enhancing polymer having about 2 up to about 65 percent by weight crystallinity;

from about 20 to 300 parts by weight of a filler selected from the group consisting of reinforcing and non-reinforcing fillers and mixtures thereof per 100 parts of said polymer blend; and from about 20 to 150 parts by weight of a processing material selected from the group consisting of paraffinic oils, naphthenic oils and waxes and mixtures thereof, per 100 parts of said polymer blend, said sheet material exhibiting a peel adhesion value of at least 2 pounds/inch and a shear adhesion value of at least 15 pounds/square inch, so that seaming is achieved in the absence of an adhesive, said sheet material being devoid of curing ingredients.

2. A self-adhering heat seamable sheet material, as set forth in claim 1, wherein said polyolefin having less than 1 percent by weight crystallinity has an ethylene content of at least about 60 percent by weight and a weight average molecular weight of at least about 100,000.

* * * * *